US011847518B2

(12) United States Patent
Amarnath et al.

(10) Patent No.: US 11,847,518 B2
(45) Date of Patent: Dec. 19, 2023

(54) SYSTEMS AND METHODS FOR CONSTRUCTING PROGRAMMABLE CREDENTIAL AND SECURITY CARDS

(71) Applicant: Block, Inc., San Francisco, CA (US)

(72) Inventors: Kuldeep Amarnath, Fremont, CA (US); Ashutosh Dhodapkar, Fremont, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 17/861,119

(22) Filed: Jul. 8, 2022

(65) Prior Publication Data
US 2022/0343130 A1 Oct. 27, 2022

Related U.S. Application Data

(63) Continuation of application No. 16/205,078, filed on Nov. 29, 2018, which is a continuation of application No. 14/933,080, filed on Nov. 5, 2015, now abandoned.

(51) Int. Cl.
*G06K 19/077* (2006.01)
*G06K 7/08* (2006.01)
*G06K 19/06* (2006.01)

(52) U.S. Cl.
CPC ....... *G06K 19/07722* (2013.01); *G06K 7/087* (2013.01); *G06K 19/06206* (2013.01); *G06K 19/07745* (2013.01)

(58) Field of Classification Search
CPC ............. G06K 19/07722; G06K 7/087; G06K 19/06206; G06K 19/07745
See application file for complete search history.

(56) References Cited

U.S. PATENT DOCUMENTS

| 4,707,594 | A | 11/1987 | Roth |
| 4,876,441 | A | 10/1989 | Tara et al. |
| 7,556,193 | B1 | 7/2009 | Amsterdam et al. |
| 7,597,267 | B2 * | 10/2009 | Miyazaki ........... G06K 19/0718 235/487 |
| 8,136,736 | B2 | 3/2012 | Couck |
| 3,382,000 | A1 | 2/2013 | Mullen et al. |
| 8,579,203 | B1 | 11/2013 | Ambeth et al. |
| 8,818,867 | B2 | 8/2014 | Baldwin et al. |

(Continued)

FOREIGN PATENT DOCUMENTS

CN   105122151 A * 12/2015 ......... G06Q 30/0261

OTHER PUBLICATIONS

CN105122151A Facilitating access to location-specific information using wireless devices, 37 pages. (Year: 2023).*

(Continued)

*Primary Examiner* — Tuyen K Vo
(74) *Attorney, Agent, or Firm* — FIG. 1 Patents

(57) ABSTRACT

A method for designing and constructing a thin programmable dynamic credential card is disclosed. The thin programmable dynamic credential card may comprise multiple layers, including a top surface layer containing an opening through which a graphical display system below the top surface layer can be viewed. The graphical display system is configured to present at least one coded image. The at least one coded image is determined based at least in part on context data associated with a context of the programmable credential card.

20 Claims, 11 Drawing Sheets

(56) References Cited

U.S. PATENT DOCUMENTS

| | | |
|---|---|---|
| 9,010,644 B1 | 4/2015 | Workley |
| 9,317,846 B2 | 4/2016 | Baldwin et al. |
| 10,127,488 B2 | 11/2018 | Amarnath et al. |
| 2004/0255081 A1 | 12/2004 | Arnouse |
| 2005/0045729 A1* | 3/2005 | Yamazaki .......... G06K 19/0704 257/E23.176 |
| 2005/0194453 A1 | 9/2005 | Conner et al. |
| 2007/0241201 A1 | 10/2007 | Brown et al. |
| 2008/0067247 A1 | 3/2008 | McGregor et al. |
| 2008/0314983 A1 | 12/2008 | Capurso et al. |
| 2009/0006262 A1 | 1/2009 | Brown et al. |
| 2009/0099947 A1 | 4/2009 | Boehm et al. |
| 2009/0143104 A1 | 6/2009 | Loh et al. |
| 2009/0169776 A1 | 7/2009 | Herslow |
| 2010/0039594 A1 | 2/2010 | Golan et al. |
| 2010/0265037 A1 | 10/2010 | Domsten et al. |
| 2011/0031319 A1 | 2/2011 | Kiekhaefer et al. |
| 2011/0062242 A1* | 3/2011 | Cowcher .......... G06K 19/07327 235/492 |
| 2011/0108629 A1 | 5/2011 | Mueller-Hipper et al. |
| 2011/0174874 A1 | 7/2011 | Poznansky et al. |
| 2011/0279242 A1* | 11/2011 | Krawczewicz .... G06K 19/0723 340/10.6 |
| 2011/0297750 A1 | 12/2011 | Huber et al. |
| 2012/0188732 A1 | 7/2012 | Poidomani et al. |
| 2012/0191513 A1 | 7/2012 | Ocher |
| 2012/0217305 A1* | 8/2012 | Yamazaki ........ G06K 19/07749 235/488 |
| 2012/0222889 A1 | 9/2012 | Davis et al. |
| 2013/0013499 A1 | 1/2013 | Kalgi |
| 2013/0015441 A1* | 1/2013 | Takayama .......... G06Q 20/105 257/E29.003 |
| 2014/0019352 A1 | 1/2014 | Shrivastava |
| 2014/0117094 A1 | 5/2014 | Workley et al. |
| 2014/0175170 A1 | 6/2014 | Bowers |
| 2014/0249948 A1 | 9/2014 | Graylin et al. |
| 2014/0263623 A1 | 9/2014 | Robison et al. |
| 2014/0353384 A1* | 12/2014 | Hoegerl ........... G06K 19/07749 257/773 |
| 2015/0066778 A1 | 3/2015 | Jang et al. |
| 2015/0073983 A1 | 3/2015 | Bartenstein et al. |
| 2015/0115039 A1 | 4/2015 | Mosteller |
| 2015/0134513 A1 | 5/2015 | Olson et al. |
| 2015/0206047 A1 | 7/2015 | Herslow et al. |
| 2015/0332266 A1 | 11/2015 | Friedlander et al. |
| 2016/0189127 A1 | 6/2016 | Amarnath et al. |
| 2016/0224879 A1 | 8/2016 | Amarnath et al. |
| 2019/0258911 A1 | 8/2019 | Amarnath et al. |

OTHER PUBLICATIONS

Non-Final Office Action dated Nov. 22, 2016, for U.S. Appl. No. 14/993,080, of Amarnath, K., et al., filed Jan. 11, 2016.
Final Office Action dated Jul. 17, 2017, for U.S. Appl. No. 14/993,080, of Amarnath, K., et al., filed Jan. 11, 2016.
Non-Final Office Action dated May 29, 2018, for U.S. Appl. No. 14/993,080, of Amarnath, K., et al., filed Jan. 11, 2016.
Non-Final Office Action dated Oct. 9, 2019, for U.S. Appl. No. 16/205,078, of Amarnath, K., et al., filed Nov. 29, 2018.
Final Office Action dated Jan. 28, 2021, for U.S. Appl. No. 16/205,078, of Amarnath, K., et al., filed Nov. 29, 2018.
Non-Final Office Action dated Jul. 12, 2021, for U.S. Appl. No. 16/205,078, of Amarnath, K., et al., filed Nov. 29, 2018.
Final Office Action dated Nov. 8, 2021, for U.S. Appl. No. 16/205,078, of Amarnath, K., et al., filed Nov. 29, 2018.
Advisory Action dated Jan. 18, 2022 for U.S. Appl. No. 16/205,078, of Amarnath, K., et al., filed Nov. 29, 2018.
Non-Final Office Action dated May 18, 2022, for U.S. Appl. No. 16/205,078, of Amarnath, K., et al., filed Nov. 29, 2018.

\* cited by examiner

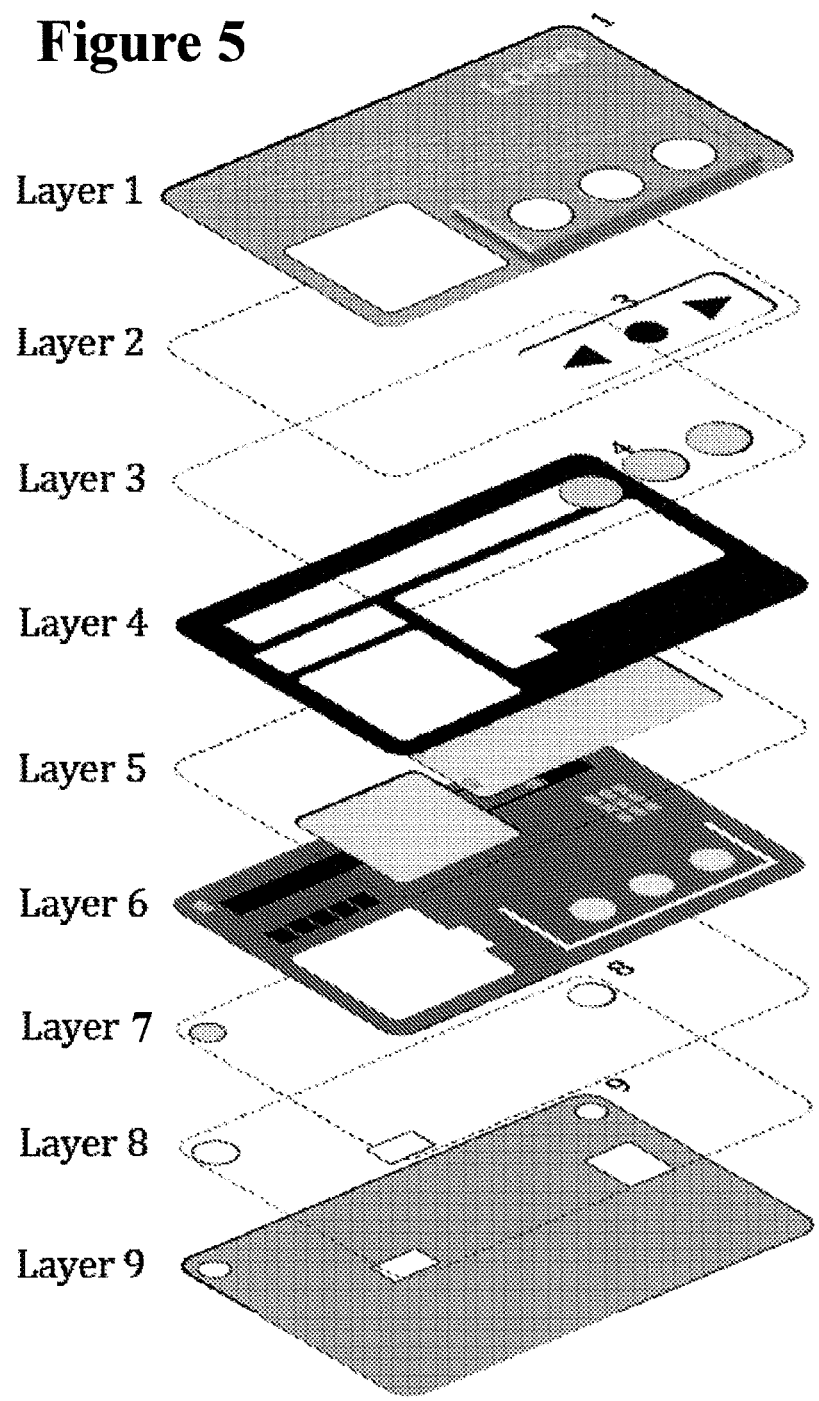

Layer 1

Layer 2

Layer 3

Layer 4

Layer 5

Layer 6

Layer 7

Layer 8

Layer 9

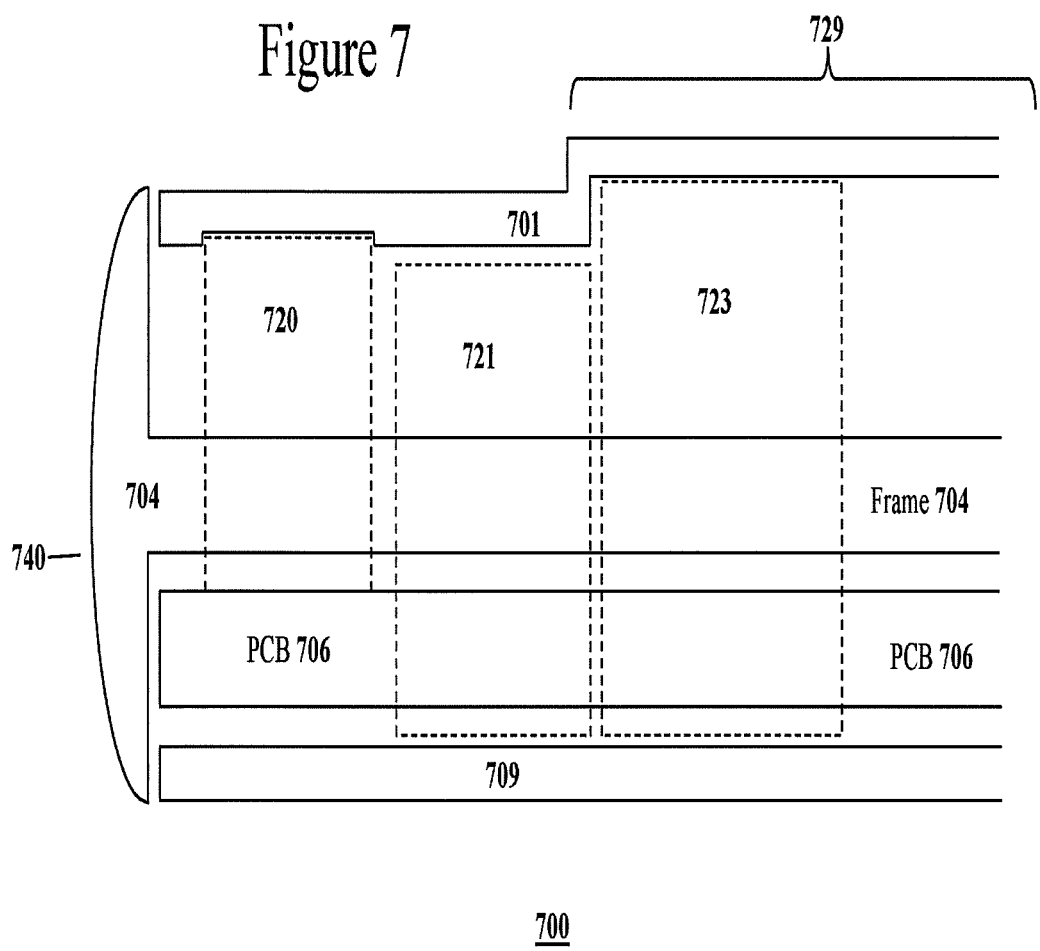

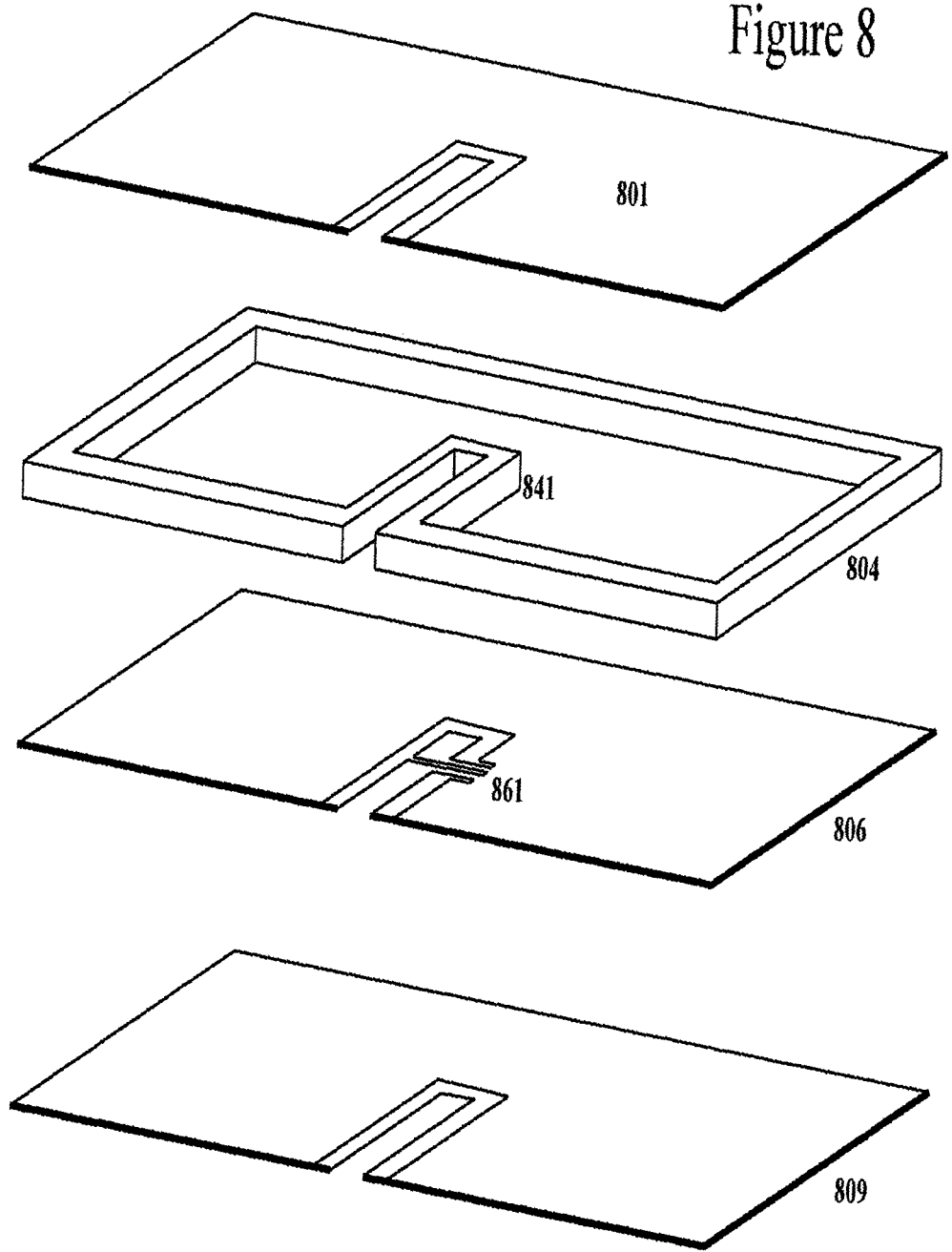

SYSTEMS AND METHODS FOR CONSTRUCTING PROGRAMMABLE CREDENTIAL AND SECURITY CARDS

RELATED APPLICATIONS

This Application claims priority to U.S. patent application Ser. No. 16/205,078, filed Nov. 29, 2018, and U.S. patent application Ser. No. 14/933,080, filed Jan. 11, 2016, which are incorporated herein by reference.

TECHNICAL FIELD

The present invention relates to the field of electronic payment systems. In particular, but not by way of limitation, the present invention discloses techniques for implementing dynamic programmable credential and security cards.

BACKGROUND

Magnetic stripes are very often used for storing information that can be quickly read back when necessary. A magnetic stripe card is a physical card typically made of hard plastic or another suitable material that contains a band or stripe of magnetic material such as iron-based particles. Digital information, such as an identifier, may be magnetically encoded on the magnetic stripe as a series of magnetic polarity reversals. The encoded digital information can subsequently be read back by swiping the magnetic stripe past a magnetic reading head. Magnetic stripe cards are commonly used as gift cards, prepaid cards, other types of stored value cards, credit cards, debit cards, employee ID cards, etc.

With conventional magnetic stripe cards, the digital identification (or credential) information is encoded onto the magnetic stripe on the magnetic stripe card before the magnetic stripe card is issued to the user of the magnetic stripe card. The user of the magnetic stripe card may then subsequently swipe the magnetic stripe card on an appropriate magnetic card reader that will then read back the encoded digital identification information. For example, a user may swipe a credit card with a magnetic stripe at a retail Point-Of-Sale (POS) terminal that will read the digital identification information encoded on the magnetic stripe card. The encoded digital identification information (or credentials) on a magnetic stripe card is in the form of a static digital identifier such as a card identification number, an account number, a credit card number, an employee identifier, etc.

Numerous other types of credential cards have become popular such as EMV cards, Radio Frequency Identifier (RFID) cards, Near Field Communication (NFC) cards, barcode cards, and other cards. These credential cards have become so popular that many people now carry around a large multitude of plastic credential cards. For example, a person may carry several credit cards, ATM cards, debit cards, a driver's license, library cards, retailer loyalty cards, RFD security cards, EMV cards, electric car charging cards, security access cards, and other plastic cards with magnetic stripes, RFID markers, EMV chips, bar codes, or other identifiers.

With EMV chips, Radio Frequency Identifier (RFID) chips, and other electronic security systems, modem credential cars now include a fair amount of electronic circuitry. In order to fit the needed electronic circuitry within a credential card and keep that electronic circuitry safe from harm, modem credential cards must be carefully designed and manufactured. Due to these growing credential card requirements, it would therefore be desirable to implement systems and methods that improve the physical design and manufacturing methods associated with credential and security card systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 5 illustrates nine layers of a programmable dynamic credential card containing a dynamic, programmable magnetic stripe, according to some embodiments of the present invention.

FIG. 7 illustrates a close up cross-section view of several layers of a programmable dynamic credential card in one embodiment FIG. 8 illustrates the layers of a card design that uses a slot antenna.

The Figures depict various embodiments for purposes of illustration only. One skilled in the art will readily recognize from the following discussion that other embodiments of the structures and methods illustrated herein may be employed without departing from the described principles.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some example embodiments are disclosed with reference to credit cards and other payment cards, the teachings of this disclosure may be used to provide any type of credential card with useful technologies. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
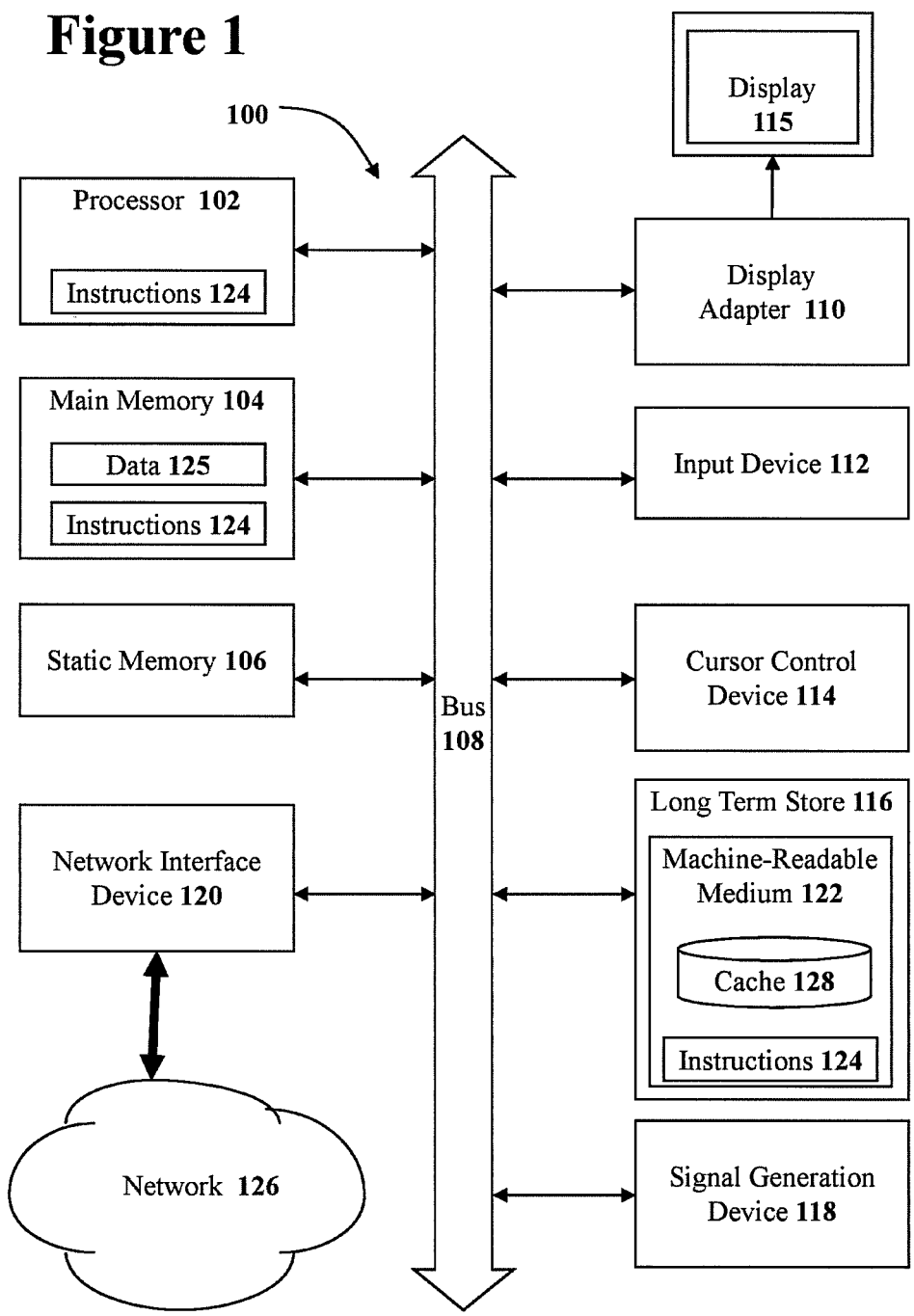
FIG. 1 illustrates a diagrammatic representation of a machine in the example form of a computer system within which a set of instructions, for causing the machine to perform any one or more of the methodologies discussed herein, may be executed.

Some embodiments of the present disclosure may use computer systems since computer systems are very often used in conjunction with magnetic stripe systems. FIG. 1 illustrates a diagrammatic representation of a machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a small card, personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a display adapter 110 that drives a display system 115 such as a Liquid Crystal Display (LCD), Cathode Ray Tube (CRT), or other suitable display system. The computer system 100 may also include an input device 112 (e.g., a keyboard), a cursor control device 114 (e.g., a trackpad, mouse, or trackball), a long term storage unit 116, an output signal generation device 118, and a network interface device 120.

The long term storage unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media. Note that the example computer system 100 illustrates only one possible example and that other computers may not have all of the components illustrated in FIG. 1 or may have additional components as needed.

The instructions 124 may further be transmitted or received over a computer network 126 via the network interface device 120. Such transmissions may occur utilizing any one of a number of well-known transfer protocols such as the File Transport Protocol (FTP). The network interface device 120 may comprise one or more wireless network interfaces such as Wi-Fi, cellular telephone network interfaces, Bluetooth, Bluetooth LE, Near Field Communication (NFC), etc.

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, flash memory, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

In the present disclosure, a computer system may comprise a very small microcontroller system. A microcontroller may comprise a single integrated circuit that contains the four main components that create a computer system: an arithmetic and logic unit (ALU), a control unit, a memory system, and an input and output system (collectively termed I/O). Microcontrollers are very small and inexpensive integrated circuits that are very often used within digital electronic devices. A microcontroller may be integrated along with other functions to create a system on a chip (SOC).

Magnetic Stripe Cards Overview

Figure 2:
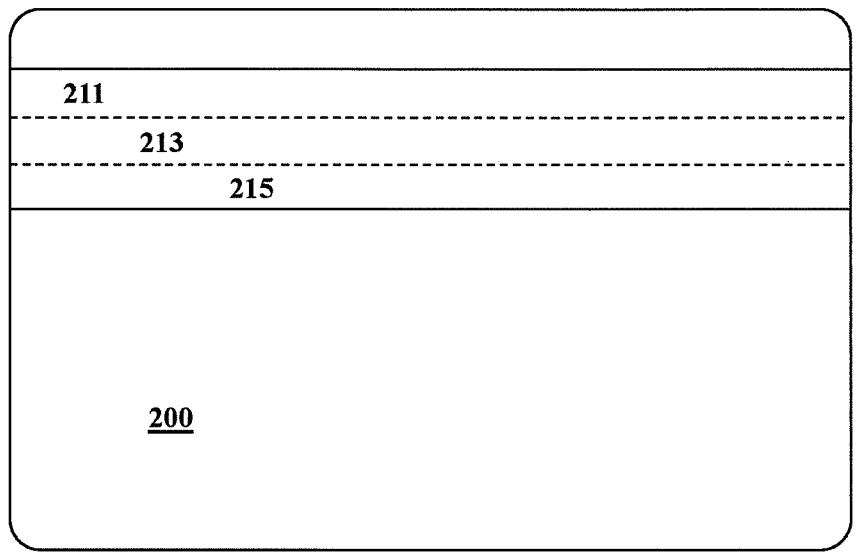
FIG. 2 illustrates a conventional three track magnetic stripe card that is commonly used for credit cards and debit cards.

A magnetic stripe card is a physical card typically made of hard plastic or another suitable material that contains a band or stripe of magnetic material. The actual magnetic stripe on a magnetic stripe card is typically contained in a plastic-like film for protection of the magnetic stripe. Conventionally, the magnetic stripe is located 0.223 inches (5.66 mm) from the upper edge of the physical card. A conventional magnetic stripe on a conventional magnetic stripe card 200 may contain three distinct magnetic tracks 211, 213, and 215 as illustrated in FIG. 2. Each of these individual magnetic tracks is 0.110 inches (2.79 mm) wide. Some magnetic stripe cards only have only two magnetic tracks or even just one magnetic track.

Digital data such as an identifier can be magnetically encoded on the magnetic tracks 211, 213, and 215 of the magnetic stripe area. The encoded information can subsequently be read by swiping the magnetic stripe past a magnetic sensor or read-head. Magnetic stripe cards are commonly used as gift cards, prepaid cards, other types of stored value cards, credit cards, debit cards, employee ID cards, etc.

Financial Application Magnetic Stripe Cards

Magnetic stripe cards may be used for a very large number of different applications. As previously mentioned, magnetic stripe cards may be used as personal identification cards (employee identification cards, driver's licenses, student identification, etc.) However, one of the most common applications of magnetic stripe cards is for facilitating financial transactions.

A first type of financial magnetic stripe card is a stored value magnetic stripe card such as a gift cards and prepaid cards. Stored value magnetic stripe cards can be associated with a financial value (e.g., $10, $50, $200) that can be spent at a designated merchant (e.g., Target, Starbuck's, Amazon, etc.). Other financial magnetic stripe cards include prepaid debit cards that virtually store a monetary value that may be spent at any merchant that accepts the prepaid debit card type (e.g., Visa, American Express, MasterCard, etc.). With non-prepaid debit cards, the associated monetary value is typically an amount stored in an associated bank account. The most well-known type of financial magnetic stripe card is the common credit card. With credit card type of financial magnetic stripe card, the value associated with the card is an associated line of credit (i.e., the amount remaining on the credit limit).

In all of these different cases of financial magnetic stripe cards, when the magnetic stripe card is presented at a merchant, the static identifying information encoded on the magnetic stripe of the magnetic stripe card (e.g., the account number, the credit card number, etc.) is used to lookup an associated value, from which the amount of the financial transaction is deducted. For security reasons, the actual value associated with the financial magnetic stripe card is not stored directly on the financial magnetic stripe card itself, but instead on a server computer system accessible from the Point-Of-Sale (POS) terminal over a network.

Other Financial Application Cards and Payment Systems

A new system for making payments with financial cards other than magnetic stripe cards is the "Europay, Master-Card, and Visa" system better known by the initials "EMV". The EMV system has a much better security system than a conventional financial magnetic stripe card. The EMV system is a standard for financial cards containing embedded integrated circuits that perform security operations. The EMV cards are commonly called IC cards, chip cards, or dip cards. EMV cards may be contact cards that must be physically inserted (or "dipped") into an EMV card reader or EMV cards may be contactless cards that can be read over a short distance using radio-frequency identification (RFID) technology. There are standards based on ISO/IEC 7816 for contact EMV cards and standards based on ISO/IEC 14443 for contactless EMV cards.

EMV cards can interact with EMV capable Point-Of-Sale (POS) terminals and automated teller machines (ATMs) to authenticate credit card or debit card transactions. EMV chip card transactions improve security over traditional magnetic stripe cards because the IC card contains an embedded microchip that is very difficult to copy. Furthermore, the transactions may further require authentication using a consumer's Personal Identification Number (PIN). At a Point-Of-Sale (POS), the chip on the EMV card communicates with the Point-Of-Sale (POS) terminal and the consumer enters a Personal Identification Number (PIN). When the Point-Of-Sale (POS) terminal is connected to the network, the authenticity of the card and chip can be confirmed along with the consumer's Personal Identification Number (PIN). Specifically, the POS terminal may communicate with a backend sever (such as that of a bank) to verify the chip on the card and consumer-entered PIN. If the Point-Of-Sale (POS) terminal is not connected to a network, the chip on the EMV card may communicate to the POS terminal whether the PIN was entered correctly. Due to this ability to authenticate a chip and a consumer-entered PIN, the EMV system is sometimes called "chip and PIN" system.

Whereas EMV system is a more secure interface than traditional magnetic stripe cards, the value associated with an EMV card is still in the online world. Specifically, the financial value associated with EMV card is stored on the backend server of an associated financial institution and the identifier encoded on the physical EMV card is still a static value that is used for identification and authentication.

In addition to the new EMV system, other types of interfaces for financial transaction cards also exist such as touch based or contactless interfaces on the card that communicate the financial card's static identifier to an appropriate card reader using a short range wireless communication protocol. For example, Near Field Communication (NFC) cards may communicate with a specially enabled NFC Point-Of-Sale (POS) terminal. Examples of such wireless payment systems include PayPass, payWave, and ExpressPay. These wireless interfaces add a level of convenience at the POS. But as with the previously described financial card systems, the identifier on the NFC type of financial card is static and associated with a single account with a financial value stored and tracked on a backend server.

Another type of contactless interface that may be used on financial payment cards is the Low Energy Bluetooth system known as Bluetooth LE, BLE, or Bluetooth Smart. Bluetooth LE is similar to the well-known Bluetooth wireless communication system but is intended to provide considerably reduced power consumption and cost while maintaining a similar communication range.

Dynamic Magnetic Stripe Cards

Conventional magnetic stripe cards use magnetic media to store the static information. The information to be stored onto the magnetic stripe card is translated to a binary format and the binary ones and zeros are encoded in the orientation of magnetic dipoles onto the magnetic media on the magnetic stripe card. To read the digitally stored information off the magnetic stripe card, the magnetic stripe card is swiped across a magnetic card reader with an appropriate read-head. The read-head senses the changes in the orientation of the magnetic dipoles during a swipe across the read-head. The change in the magnetic dipole orientations manifests as a magnetic flux reversal in a coil present in the read-head. These magnetic flux reversals in the coil induce a small electrical current that results in the generation of a potential difference between the ends of the coil in synchronization with the magnetic flux changes. The potential difference between the ends of the coil is amplified and demodulated to extract the underlying encoded digital information.

Figure 3:
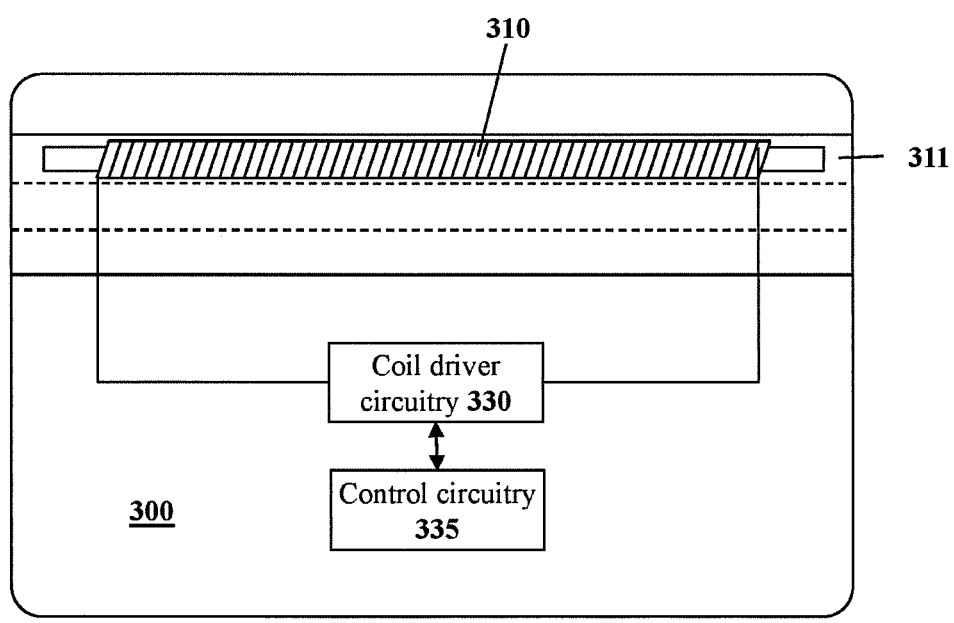
FIG. 3 illustrates a programmable dynamic magnetic stripe card with a solenoid coil that may generate a magnetic field.

Just as magnetic flux reversals induce an electrical current in a coil, driving an electrical current in a solenoid coil creates a related magnetic field as per Ampere's law. By driving an alternating current, magnetic field reversals may be created. Thus, by appropriately driving an alternative electrical current in a solenoid coil, the coil may be used to emulate the magnetic stripe of a magnetic stripe card. FIG. 3 illustrates a diagram of a programmable dynamic magnetic stripe card 300 that has a coil 310 in the first track 311 location where a traditional magnetic stripe card would have a first magnetic stripe. The solenoid coil 310 may be driven by coil driver circuitry 330. By having the coil driver circuitry 330 appropriately drive an alternating current in the solenoid coil 310 while the programmable dynamic magnetic stripe card 300 swiped in a magnetic card reader, the programmable dynamic magnetic card 300 can emulate a traditional magnetic stripe card. Specifically, the coil driver circuitry 330 modulates the alternating current through the solenoid coil 310 in time to mimic the external magnetic flux changes that a read-head measures during the swipe of a conventional magnetic stripe card.

A programmable dynamic magnetic stripe card 300 can be used to overcome many of the limitations of conventional or static magnetic stripe card. For example, a single programmable dynamic magnetic stripe card 300 can be used to emulate many different conventional magnetic stripe cards. In this manner a user only needs to carry a single programmable dynamic magnetic stripe card 300 instead of a large collection of conventional magnetic stripe cards. Furthermore, the user will not need to search through a collection of many conventional magnetic stripe cards to find the specific conventional magnetic stripe card for the current situation. In a programmable dynamic magnetic stripe card 300, the user accesses control circuitry 335 (such as a microprocessor) to select a specific set of information to emulate. The control circuitry 335 then controls the coil driver circuitry 330 to drive the solenoid coil 310 to output the proper sequence magnetic reversals. Thus, the control circuitry 335, the coil driver circuitry 330, and the solenoid coil 310 of a single dynamic magnetic stripe card 300 can replaces a large collection of conventional magnetic stripe cards.

The solenoid coils for use in a programmable dynamic magnetic stripe card may be constructed using a narrow, fine grained, high permeability core material, with a fast (e.g., 2 to 5 kilohertz or higher) switching capability. In some embodiments, the switching capability of the solenoid coil is greater than five kilohertz. Examples of suitable alloys for the solenoid coil core material include permalloy, Mu-metal, silicon steels, etc.

The total solenoid coil thickness (i.e., the core diameter plus the wire diameter plus any encasing structure, encapsulation, packaging or the like) is less than the thickness of the physical programmable dynamic magnetic stripe card. The International Organization for Standardization ("ISO") specification for payment cards, ISO/IEC 7810, defines the maximum thickness as 0.84 millimeters (0.033 inches), such that in one embodiment the total solenoid coil thickness is less than this amount. In one embodiment, the solenoid coil core diameter is approximately 0.25 mm and the wire diameter approximately 0.10 mm (38 AWG).

Multiple Format Programmable Dynamic Credential Card

Figure 4:
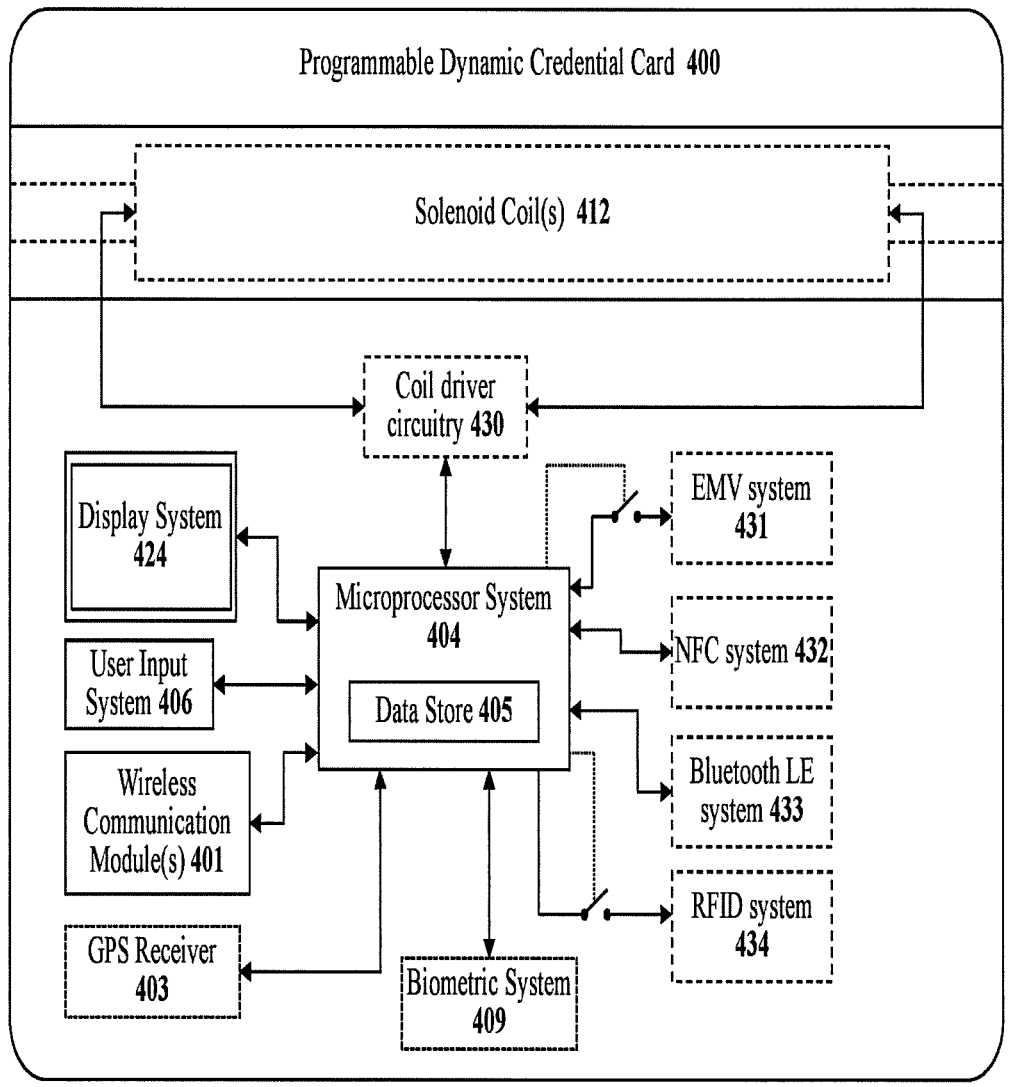
FIG. 4 illustrates a detailed block diagram of a programmable dynamic credential card that may support many accounts and many different types of Point-Of-Sale terminals.

Instead of supporting only magnetic stripes as a point-of-sale (POS) interface, a programmable dynamic credential card may support many different point-of-sale (POS) interfaces. FIG. 4 illustrates a detailed block diagram of a programmable dynamic credential card 400 that supports several different types of point-of-sale (POS) interfaces. As illustrated in the block diagram of FIG. 4, the programmable dynamic credential card 400 is controlled by on-card microprocessor system 404. The microprocessor system 404 includes a data store 405 for storing software code and information needed for operation. The information needed may include identification information about the user of the programmable dynamic credential card 400, security information, and financial identifier information associated with that user.

The microprocessor system 404 is supported by a number of input and output subsystems. A first output system is the graphical display system 424 that can be used to display alphanumeric text and graphical images to a user. The graphical display system 424 is used in conjunction with a user input system 406 so that a user may interact with the programmable dynamic credential card 400 in order to make selections, enter PIN numbers, and otherwise communicate with the programmable dynamic credential card 400. The user input system may comprise buttons, a keyboard, a touchscreen on top of the graphical display system 424, or any other suitable user input system.

In addition to communicating with a user, the graphical display system 424 may be used to display bar codes, QR codes, and other such coded images in order to transmit information to scanners at Point-Of-Sale (POS) terminals and ticket readers. Thus, the graphical display system 424 can be used to communicate e-gift card identifier information. Similarly, the graphical display system 424 can be used to communicate sports event ticket information, airline ticket information, or concert ticket information.

The programmable dynamic credential card 400 will also generally include a wireless communication module 401 for communicating with other digital computing devices such as personal computer systems or mobile computing devices. In particular, the programmable dynamic credential card 400 will likely often communicated with a mobile computing device such as the user's smartphone. Such wireless communication may occur with Wi-Fi, Bluetooth, Near Field Communication (NFC), Bluetooth LE, or any another suitable wireless communication protocol.

In some embodiments the programmable dynamic credential card 400 may contain a global positioning system (GPS) receiver 403 for tracking the location of the programmable dynamic credential card 400. Location tracking information can be used to have the programmable dynamic credential card 400 make logical inferences as to what information the user may most likely need next and display that information. For example, if the card detects that it is at a particular retailer where the consumer typically uses a particular credit card, the programmable dynamic credential card 400 may prepare itself to act as that credit card. Similarly, if the programmable dynamic credential card 400 detect that it is in close proximity to a particular sporting event arena or concert venue, the programmable dynamic credential card 400 may opt to display the coded information for an appropriate ticket for that sporting event arena or concert venue on this date.

In embodiments without a global positioning system (GPS) receiver 403, the same location-based functionality may be implemented by communicating with the user's smartphone. Specifically, the programmable dynamic credential card 400 may communicate with a user's smartphone, obtain location information from that smartphone, and then use that location information to provide the same functionality.

To communicate with Point-Of-Sale (POS) terminals, the programmable dynamic credential card 400 contains one or more subsystems for communicating identification and authentication information to Point-Of-Sale (POS) terminals. Since the current most common type of communication system on financial payment cards is encoded magnetic stripes, a programmable dynamic credential card 400 may have a dynamic magnetic field generation system for emulating a conventional magnetic stripe.

Specifically, the programmable dynamic credential card 400 may include solenoid coil(s) 412 that are driven coil driver circuitry 430 to generate an encoded magnetic field. The coil driver circuitry 430 can be controlled the microprocessor system 404 that provides the identifier information needed to generate the proper magnetic field pattern of the desired convention magnetic stripe card. Details on implementing a dynamic magnetic stripe system can be found in the co-pending U.S. patent application title "Systems And Methods For Creating Dynamic Programmable Magnetic Stripes", filed on Oct. 26, 2015 and having Ser. No. 14/922, 771. If the programmable dynamic credential card 400 determines that it is not secure, the coil driver circuitry 430 will be disabled.

Although the United States currently largely uses magnetic stripe card, there is move underway to use more secure methods of communicating financial identification and authentication information. Furthermore, there are now a wide variety of new types of financial identification systems such as the e-gift cards previously described. Thus, a programmable dynamic credential card 400 may have different or additional subsystems for providing financial identification and authentication information with Point-Of-Sale terminals.

One type of Point-Of-Sale communication system that may be used is the new "Europay, MasterCard, and Visa" (EMV) subsystem 431. As previously described, the EMV system 431 may be a contact or contactless system. In one embodiment, the microprocessor system 404 controls a switch that can deactivate the EMV subsystem 431 such that the EMV subsystem 431 cannot be used if the microprocessor system 404 has determined that proper security requirements have not been met.

Another type of communication system that may be used for communicating with Point-Of-Sale (POS) terminals is the "Near Field Communication" (NFC) subsystem 432. The NFC protocol is a new wireless communication protocol that is being implemented within most smartphones as method of implementing payment systems that only requires the NFC equipped system to be in close proximity to an NFC reader equipped Point-Of-Sale (POS) terminal. The processor 404 may deactivate the NFC subsystem 432 if security precautions have not been satisfied. To reduce costs, the same subsystem may be used to implement both the wireless communication module(s) 401 and the NFC subsystem 432.

Yet another type of Point-Of-Sale communication system that a programmable dynamic credential card 400 may use to communicate with Point-Of-Sale (POS) terminal is a Bluetooth Low Energy (Bluetooth LE) system 433. The Bluetooth LE protocol is designed to minimize energy usage and thus extend battery life for mobile digital devices like the programmable dynamic credential card 400. Again, the same circuitry may be used to implement both the wireless communication module(s) 401 and the Bluetooth LE subsystem 433. Note that the processor 404 may refuse to operate the Bluetooth LE subsystem 433 if security precautions have not been satisfied.

Another type of Point-Of-Sale communication system that the programmable dynamic credential card 400 may use to communicate with Point-Of-Sale (POS) terminal is a Radio Frequency Identification (RFID) system 434. As with the EMV system 431, the RFID system may be deactivated by the microprocessor system 404 if sufficient security requirements have not been fulfilled.

Various different security systems may be used to determine when sufficient security requirements have been met. For example, an associated mobile device may be registered and bonded with the programmable dynamic credential card. Then, if the dynamic programmable credential card can determine that the associated mobile device is present in the immediate vicinity (such as 6 feet) then the security requirement may be deemed fulfilled. This concept of a bonded mobile digital device that is bonded with a specific programmable dynamic credential card will be referred to as an 'associated mobile device' in this document. In other embodiment, a Personal Identification Number (PIN) may be entered onto the programmable dynamic credential card to fulfil security requirements.

In some embodiments, a biometric security system 409 may be included in a programmable dynamic credential card 400. The programmable dynamic credential card 400 may require that a user authenticate the user with the biometric security system 409 before the programmable dynamic credential card 400 will operate. The biometric security system 409 may comprise fingerprint reader. Thus, a verified fingerprint on the programmable dynamic credential card 400 or the bonded mobile device may fulfil the security requirements.

In addition to the various subsystems 430 to 434 for communicating with Point-Of-Sale (POS) terminals, a programmable dynamic credential card 400 may also use the graphical display system 424 to communicate with Point-Of-Sale (POS) terminals. For example, a user may receive a gift card that includes a QR code or a bar code that can be presented at a retailer for payment. The microprocessor system 404 can cause the graphical display system 424 to display that QR code or bar code and then the graphical display system 424 may then be presented to the optical scanner of the Point-Of-Sale (POS) terminal for payment. Again, if the programmable dynamic credential card 400 determines that security has been breached, the microprocessor system 404 will not display any QR codes or bar codes on the graphical display system 424.

Programmable Dynamic Credential Card Manufacturing Issues

Referring back to FIG. 4, a programmable dynamic credential card 400 may be constructed with at least one point-of-sale communication system and may contain several different point-of-sale communication systems (solenoid coils 412, EMV system 431, NFC system 432, Bluetooth system 433, RFID system 434, etc.). Thus, a programmable dynamic credential card 400 requires a fair amount of circuitry embedded within the programmable dynamic credential card 400 to operate. However, conventional plastic magnetic stripe cards were never designed to contain electronic circuitry. Thus, a programmable dynamic credential card 400 must be very carefully mechanically designed to contain all the needed electronic circuitry for the programmable dynamic credential card 400.

Fitting all of these electronic components of programmable dynamic credential card 400 into a form factor that complies with the International Standards Organization ("ISO") specification presents several design and manufacturing challenges. The ISO specification for payment cards states that a payment card thickness is not to exceed 0.033 inches with the exception of a limited embossed area that is typically used for a raised account number, name, expiration date, etc. That embossed area can be as high as 0.050 inches. The embossed area provides an opportunity for placement of thicker electronic components on an ISO compliant payment card.

Even when carefully utilizing the embossed area, some of the above-described electronic components present special challenges in the design and construction of a programmable dynamic credential card 400. For example, the battery for the programmable dynamic credential card 400 should have some protection against puncturing. In order to allow for reliable wireless communication, the wireless antenna(s) should not be completely enclosed in a shielding material. The graphical display system 424 is typically made of glass (or a glass-like material), and thus should be housed in a rigid frame in order to prevent flexing in that area of the card. At least one input button should be protected against being inadvertently pressed when inside a wallet, to prevent the programmable dynamic credential card 400 from turning itself on in the wallet and draining the battery. In some embodiments, the mechanical construction of the programmable dynamic credential card 400 is designed to provide the ability for the card to flex in the wallet but regain form after the stressor is removed, and abrasion resistance to maintain the aesthetics of the card.

A Thin Programmable Dynamic Credential Card

To construct a sophisticated programmable dynamic credential card 400, FIG. 5 illustrates a nine (9) layer design for creating a programmable dynamic credential card. The construction of the programmable dynamic credential card of FIG. 5 consists of a sandwich structure of two thin (e.g., 0.003 inches) non-magnetic outside panels (that may be stainless steel sheets) with a non-magnetic frame in the center. The two outside panel surfaces and the internal frame to provide the desired rigidity and abrasion resistance for the programmable dynamic credential card. The various electronic components and circuit boards are contained within pockets of the multi-layer sandwich structure. The sandwich structure can be held together using an adhesive or other suitable binding system. In one embodiment, a pressure sensitive adhesive is used and in another embodiment a laser weld is used to join the various sandwiched layers.

FIG. 5 illustrates the primary layers of a nine layer sandwich structure construction, according to one embodiment. In other embodiments other layering designs and number of layers may be utilized. Note that the adhesive is not shown as a layer in the sandwich structure construction of FIG. 5, but can be placed between, for example, layers 1 and 4, layers 4 and 6, and layers 6 and 9. Details and properties of each different sandwich structure layer, including example choices of possible materials, are described below in conjunction with FIGS. 6A to 6I.

Figure 6A:
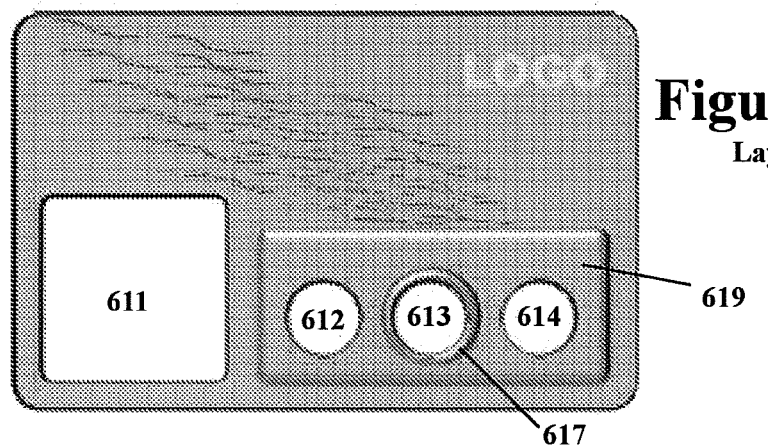
FIG. 6A illustrates layer 1 of a programmable dynamic credential card that provides a top surface for the card.

FIG. 6A illustrates a top layer, layer 1, according to one embodiment of the sandwich structure of the programmable dynamic credential card. Layer 1 comprises the top surface of the programmable dynamic credential card. In one embodiment, stainless steel is used for the top surface of the card. In other embodiments, other materials can be used, such as a different metal, plastic, Mylar, etc. An advantage of using a metal is that it provides durability and abrasion resistance without requiring additional lamination with plastic. This helps reduce the total thickness of the card. The logo and other artwork can be etched or stamped into the metal using standard manufacturing processes. If aluminum is used for the front surface, that aluminum can be anodized to create different colors for the artwork on the top surface.

The top surface layer may be embossed to create a raised area 619 located near the bottom half of the card such that it is within the bounds specified by ISO/IEC 7811 card specification. The raised area 619 can be utilized to accommodate taller components but still within total thickness allowed in the embossed area.

One material that may be for the top surface of the card used is a glass fiber reinforced epoxy laminate (such as FR-4) or a polyimide flex substrate typically used in printed circuit board manufacturing. FR-4 is a grade designation assigned to glass-reinforced epoxy laminate sheets. FR-4 is a composite material composed of woven fiberglass cloth with an epoxy resin binder. In case of a glass fiber reinforced epoxy laminate or polyimide, the top surface can be fabricated using a conventional process used for manufacturing printed circuit boards. The conductors used in such a process (copper, gold, tin, nickel) can be used for electrical traces and/or for decorative/artistic purposes on the top surface. Fiber reinforced material in conjunction with the soldermask layer typically used in circuit board fabrication has the advantage of very good abrasion resistance. The top surface may be covered with soldermask material to provide the abrasion resistance quality.

In the top surface layer illustrated in FIG. 5 and FIG. 6A, the top surface has four cut-outs: one cut-out 611 for a graphical display and three cut-outs 612, 613, and 614 for the input buttons. It is to be understood that the number, shapes and positions of the buttons, and hence the cut-outs, can vary between embodiments as desired. The top surface may have artwork printed on by means of a conventional printing process such as pad printing or silk screening. Alternatively, artwork may be etched onto the top surface by means of a laser or chemically. A hard clear coat layer may be added to the top surface (and bottom surface) for additional abrasion resistance.

In the embodiment of FIG. 5 and FIG. 6A, the area 619 around the buttons is raised through an embossing process to provide space for electronic components with a thicker profile. The embossed area and the button area can be separate or joined together while adhering to the ISO card specification. Furthermore, the periphery 617 around the wakeup button (the center button) is raised so that that the wakeup button does not get activated when the programmable dynamic credential card is stored inside a wallet, thereby preventing unnecessary drainage of the battery. In other embodiments the peripheries of other buttons can be raised as desired.

Figure 6B:
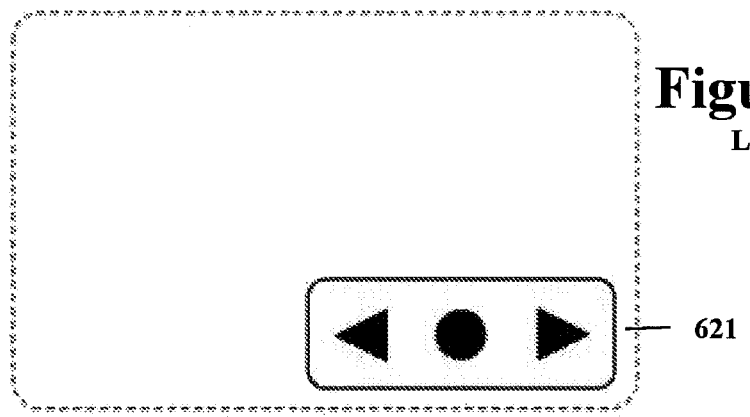
FIG. 6B illustrates layer 2 of a programmable dynamic credential card that provides artwork for button on the card.

FIG. 6B illustrates a layer 2 according to one embodiment. Layer 2 comprises the artwork 621 for the buttons. The button artwork 621 can be printed on a thin material such as Mylar, polyester, polyvinyl, or another appropriated material. The artwork sheet is superimposed on the mechanical buttons to provide indicators of the functionality of each different button. The specific artwork utilized is a design parameter that can vary between embodiments as appropriate.

Figure 6C:
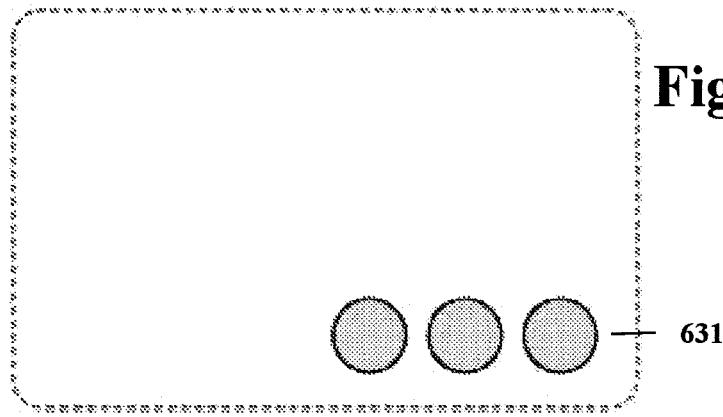
FIG. 6C illustrates layer 3 of a programmable dynamic credential card that comprises mechanical buttons on the card.

FIG. 6C illustrates layer 3 according to one embodiment. Layer 3 comprises the buttons 631 that a user may use to interact with the programmable dynamic credential card. As illustrated in FIG. 6C, in one embodiment the buttons are in the form of thin metal discs (e.g., Snaptron) that provide contact on the circuit board when pressed. In other embodiments, the buttons can be in the form of mechanical switches that can be soldered or placed onto the circuit board in the card. In yet other embodiments, the button may be capacitive touch switches. One advantage of metal disc buttons 631 is that the metal disc buttons do not consume any power in the manner that capacitive switches do such that metal discs will allow the card to operate for longer. In addition, metal disk buttons 631 provide a comforting tactile feel that provides valuable feedback to the user such that the user knows when the button has been pressed.

Figure 6D:
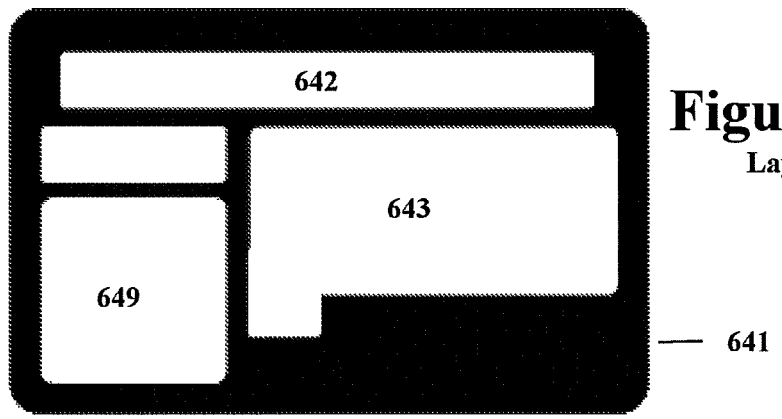
FIG. 6D illustrates layer 4 of a programmable dynamic credential card that comprises a structural frame for the card.

FIG. 6D illustrates layer 4 according to one embodiment of the programmable dynamic credential card of the present disclosure. Layer 4 comprises the frame 641 for the programmable dynamic credential card. The frame 641 provides mechanical support to the programmable dynamic credential card. In one particular embodiment, the frame 641 is made from 0.016 inch thick stainless steel for rigidity. In other embodiments, other thicknesses of stainless steel or other rigid materials are used. For example, the frame 641 can also be made from other materials such as PVC, FR-4, plastic, or materials used for construction of Printed Circuit Boards (PCBs) such as fiberglass-resin composites and other materials discussed with reference to FIG. 6A. The thickness of the frame 641 is constrained by the total thickness of the card, as well as the thickness of the thickest component allowing for tolerances.

The frame 641 may be used to provide a protective side edge for the programmable dynamic credential card. FIG. 7 illustrates a close up cross-section view of several layers of a programmable dynamic credential card in type of embodiment. Referring to FIG. 7, the frame 704 is the central layer of the programmable dynamic credential card and provides rigid structure for the card. At the edge 740 of the frame 704, the edge 740 is flared out to provide a protective hard edge for the programmable dynamic credential card.

Recesses may be made into the material used for the top and bottom surface layers to accommodate electrical components. An example of this technique is illustrated in FIG. 7 wherein the top surface 701 material has a recess made to accommodate a thick electrical component 720. The recess in the top surface 701 helps hold the thick electrical component 720 in place along with the cut-out in the frame 704 that accommodates the thick electrical component 720. To accommodate even thicker internal components, the embossed area of the card (as specified by the ISO/IEC 7811 specification) may be used as previously described. For example, FIG. 7 illustrates the embossed area 729 being used to fit in the thicker internal electrical component 723. In this manner, thick components such as a battery may be accommodated.

As discussed above, the frame 641 provides mechanical strength around the graphical display that is placed into cut-out area 649 as well as to other delicate internal components housed within the card. In one embodiment, to provide flexibility yet protect the graphical display and other delicate internal components that need reinforcement, a hybrid frame 641 may be used. With a hybrid frame, the framing around the graphical display (or other delicate internal components) is steel and the framing around the rest of the card is PVC or another material.

The frame 641 has pockets for each of the components that go onto the printed circuit board (PCB). The embodiment of FIG. 6D includes a first cut-out 642 for a solenoid coil, a second cut-out 643 for a battery, and third cut-out 649 for a graphical display. The specific number, position and shape of the cut-outs in the frame 641 vary between embodiments. Excess space in these cut-outs can be filled with a material such as epoxy once the printed circuit board (PCB) is affixed to the frame 641 in order to provide rigidity for the components. The epoxy also serves as a tamper-resistance system to protect the security of the programmable dynamic credential card.

In another embodiment, the cavity in the cut-outs is filled by an overmolding material that is overmolded directly onto the underlying printed circuit board. The overmolding over the printed circuit board may be done separately from the frame or can be done with the frame included. In another embodiment of the overmolding approach, the frame may be eliminated if a sufficiently rigid material is used for the overmolding. In such a process, the overmolding material forms both the frame and filling around the printed circuit board and components. In yet another embodiment, the cavity might be filled with an insert that fits around the components. The insert might be made of metal, plastic or fiber reinforced epoxy composites. In all these embodiments, whether by overmolding, epoxy fillers, hot melt adhesives or inserts, the goal is to provide a flat top surface that is flush with the frame and to which the top skin can adhere strongly.

Figure 6E:
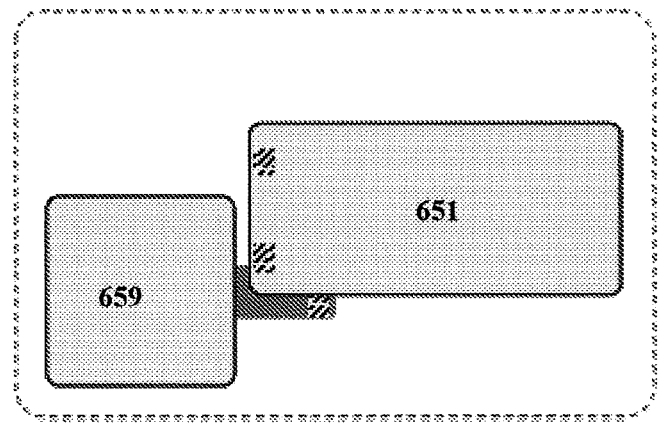
FIG. 6E illustrates layer 5 of a programmable dynamic credential card that comprises the thicker internal components used in the card.

FIG. 6E illustrates layer 5 according to one embodiment of the programmable dynamic credential card. Layer 5 comprises the thicker internal components. In the embodiment of FIG. 6E, the thicker internal components include the graphical display 659 and the battery 651. FIG. 7 illustrates a cross-section view of how thicker internal components 720, 721, and 723 may overlap with other layers such as the frame 704 and the printed circuit board 706.

Referring back to FIG. 6E, in one embodiment the graphical display 659 is in the form of an Electro-phoretic Display ("EPD"). In another embodiment, a Liquid Crystal Display ("LCD") is used for the graphical display 659. The graphical display 659 is ultra-thin (e.g., <0.030 inches). The graphical display 659 may be attached to a printed circuit board (PCB) using, for example, hot bar soldering, anisotropic conducting adhesive tape, or another suitable technique.

The battery 651 for the programmable dynamic credential card may be in the form of an ultra-thin lithium-ion primary battery or rechargeable type battery. The battery 651 may be attached to the printed circuit board (PCB) using ultrasonic welding, conductive adhesive tape, epoxy, or other suitable adherence system. These adhesive options are called out separately because the battery 651 cannot go through a high temperature soldering process, such as the reflow process, that can be used to attach many other electrical components to the printed circuit board (PCB).

Figure 6F:
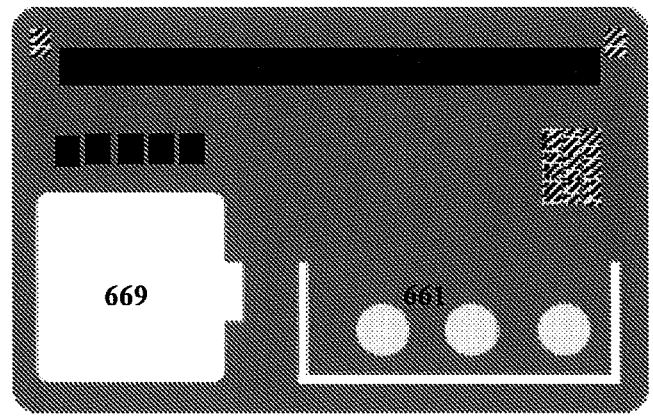
FIG. 6F illustrates layer 6 of a programmable dynamic credential card that comprises a printed circuit board (PCB) used in the card.

FIG. 6F illustrates layer 6 according to one particular embodiment of the present disclosure. Layer 6 comprises a printed circuit board (PCB). The printed circuit board (PCB) houses electronic components including the processor, electrical traces for switches, and EMV (Europay, MasterCard and Visa) contacts, an antenna, and dynamic magnetic solenoid coil. In one embodiment the PCB used is a flex PCB (Polyimide based), which allows for a thickness of 0.004 inches. Other PCB technologies (such as fiberglass-resin composites) with similar thickness can also be used.

Note that FIG. 6F illustrates the area 669 of the printed circuit board (PCB) under the graphical display as being cut out. The reason for this is that the graphical display is the thickest internal component such that it is desirable to minimize additional thickness both under and over the graphical display in order to fit the graphical display into the very thin form factor of a credit card. The printed circuit board (PCB) might have cut outs over certain areas so as to accommodate thicker components in those areas such as batteries or displays. This is done to ensure that total thickness is within the card ISO specification value.

In one embodiment (not shown), the printed circuit board (PCB) can be sized such that the printed circuit board (PCB) lies entirely within the cut outs of the frame layer. (The cut-outs of the frame 641 of layer 4. The frame may have channels to allow for printed circuit boards (PCB) to connect from one cut out to the adjacent cut-out. In another embodiment the frame can overlap with the printed circuit board (PCB) and the two layers can be bonded together with a very thin adhesive layer (such as pressure sensitive adhesive) in between.

Note that as illustrated in FIG. 6F various areas indicated metallization on bottom surface of the printed circuit board (PCB). For example, one area of metallization is used on the bottom surface for the EMV contacts. Metallization on the top surface of the printed circuit board (PCB) for the buttons.

Figure 6G:
FIG. 6G illustrates layer 7 of a programmable dynamic credential card that comprises trigger buttons or other components used to detect a card swipe.

FIG. 6G illustrates Layer 7 for a multi-layer programmable dynamic credential card according to one embodiment. Layer 7 comprises small trigger buttons on the corners of the programmable dynamic credential card. These buttons trigger the activation of the solenoid coils that emulate a magnetic stripe when the programmable dynamic credential card is swiped through a magnetic card reader system. The trigger buttons may protrude slightly out of the back skin and when depressed are flush with the profile of the card. Multiple trigger buttons may be employed to gauge swipe speed and to improve reliability of swipe detection. In other embodiments, other components may be used to determine when the programmable dynamic credential card is being swiped through a card reader system instead of using trigger buttons.

Figure 6H:
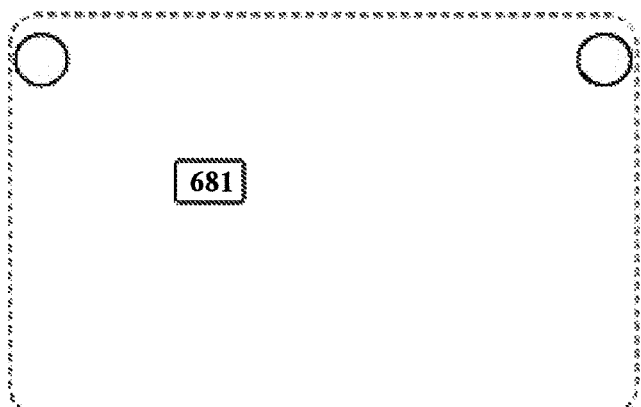
FIG. 6H illustrates layer 8 of a programmable dynamic credential card that comprises a printed circuit board (PCB) used in the card.

FIG. 6H illustrates layer 8 according to one embodiment of the programmable dynamic credential card. Layer 8 comprises protective film layer. This film layer protects the trigger buttons (if used) from exposure to the environment outside of the programmable dynamic credential card.

In one embodiment, the rectangular section 681 provides an electromagnetically transparent window to help allow an antenna to communicate with the outside world. This is useful for embodiments that use metal outer layers.

For communication with a smart phone over Wi-Fi, Bluetooth LE, or other wireless communication system, a slot antenna might be provisioned making use of the cards metal top and/or bottom layers (and/or bottom surface PCB traces.) A slot for a slot antenna may be positioned either entirely within the card boundary or may extend from an edge of the card edge to the interior. The length of the slot is appropriately selected to ensure maximal efficiency of the antenna performance.

FIG. 8 illustrates the layers that may be used to implement a card design that uses a slot antenna. The top surface layer 801 has a cut out location for the slot antenna. The frame layer 804 has a conducting joint 841 that is between the top surface layer 801, the printed circuit board 806, and the bottom surface layer 809. The printed circuit board 806 has a radio frequency feed in 861 that provides the radio signal.

The slot may be designed such that the slot is slit cut in the metal surface and/or a coincident slit in the conductive portions of the printed circuit board (PCB). The antenna is fed with radio frequency power such that contacts are made on opposite sides of the slot by means of impedance controlled traces on the printed circuit board (PCB). The dimensions of the slot and the location of the feed point 861 for the RF signal relative to the ends of the slot are optimized to allow for maximal efficiency in the antenna radiation and reception. A different embodiment may have the antenna slot on only one or two conducting layers while the remaining layers are non-conducting, such as plastic, FR4 or other such non-conducting layers.

Figure 6I:
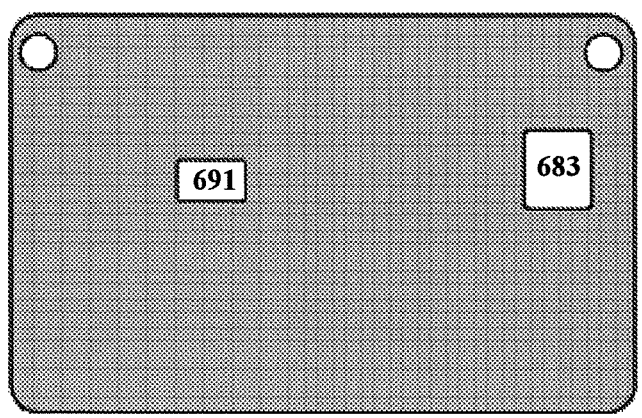
FIG. 6I illustrates layer 9 of a programmable dynamic credential card that comprises a bottom surface for the card.

Finally, FIG. 6I illustrates layer 9 according to one embodiment of the present disclosure. Layer 9 comprises the bottom surface to the programmable dynamic credential card. The bottom (back) surface provides the protective covering for the card. Using a steel skin provides maximum durability, but other materials may be used as well as described with reference to the top surface layer disclosed with reference to FIG. 6A. The bottom surface embodiment illustrated in FIG. 6I has openings for the trigger buttons or other trigger mechanisms used to detect a swipe of the programmable dynamic credential card.

The bottom surface may have one or more windows to expose certain components. In the embodiment of FIG. 6I, the bottom surface has two windows: one window 683 for the EMV (chip and pin) contacts and another electromagnetically transparent window 691 for wireless communication. Other embodiments of the bottom surface may have other windows for other reasons. For example, other embodiments may have window openings for wireless communication components such as near field communication (NFC) components or Radio Frequency Identification (RFID) components. Some embodiments may have windows for purposes of creating a slot antenna.

Figure 9A:
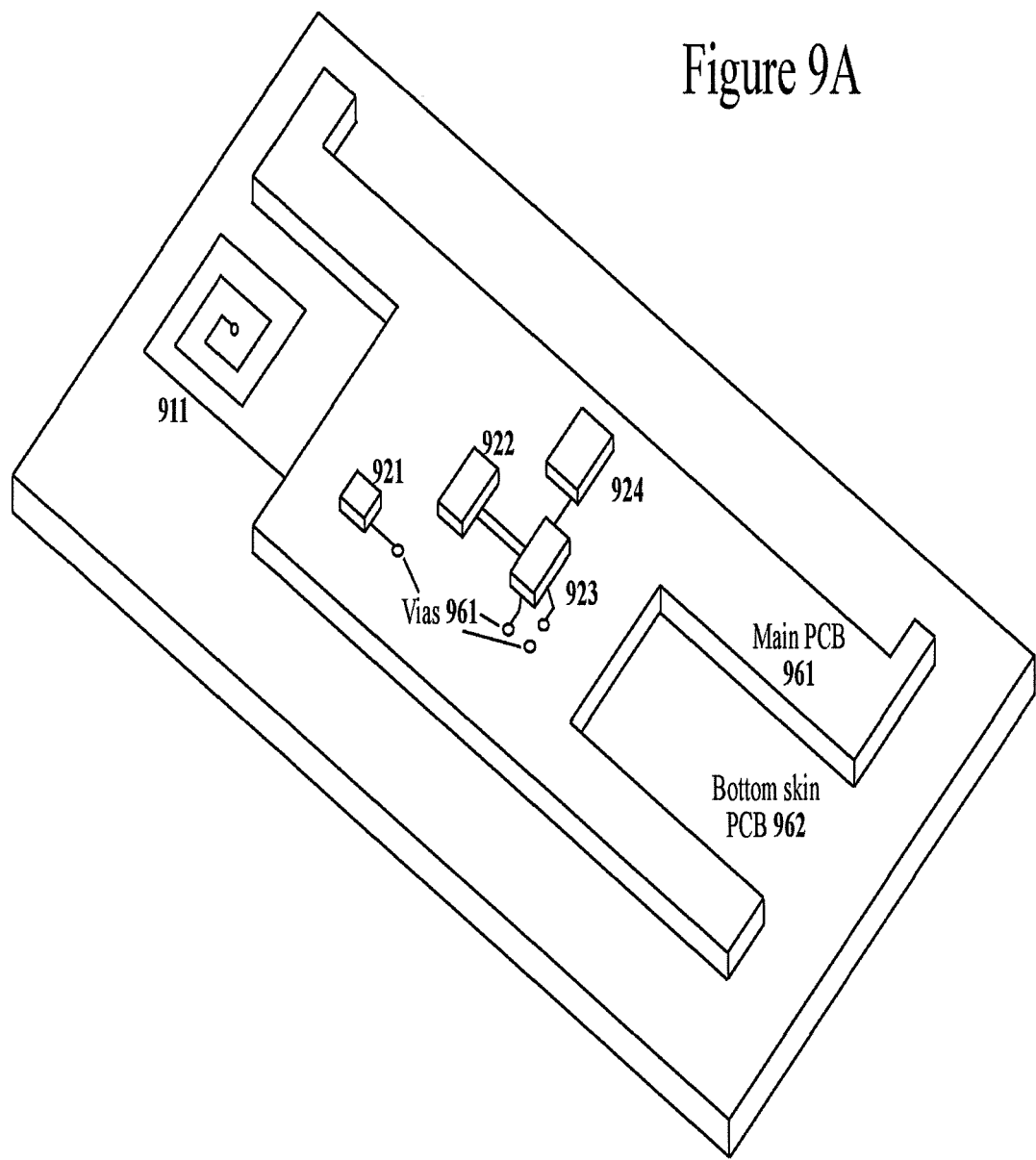
FIG. 9A illustrates an isometric view of an embodiment that uses a four metal conductor layer printed circuit board to act as both the bottom skin and the main printed circuit board.
Figure 9B:
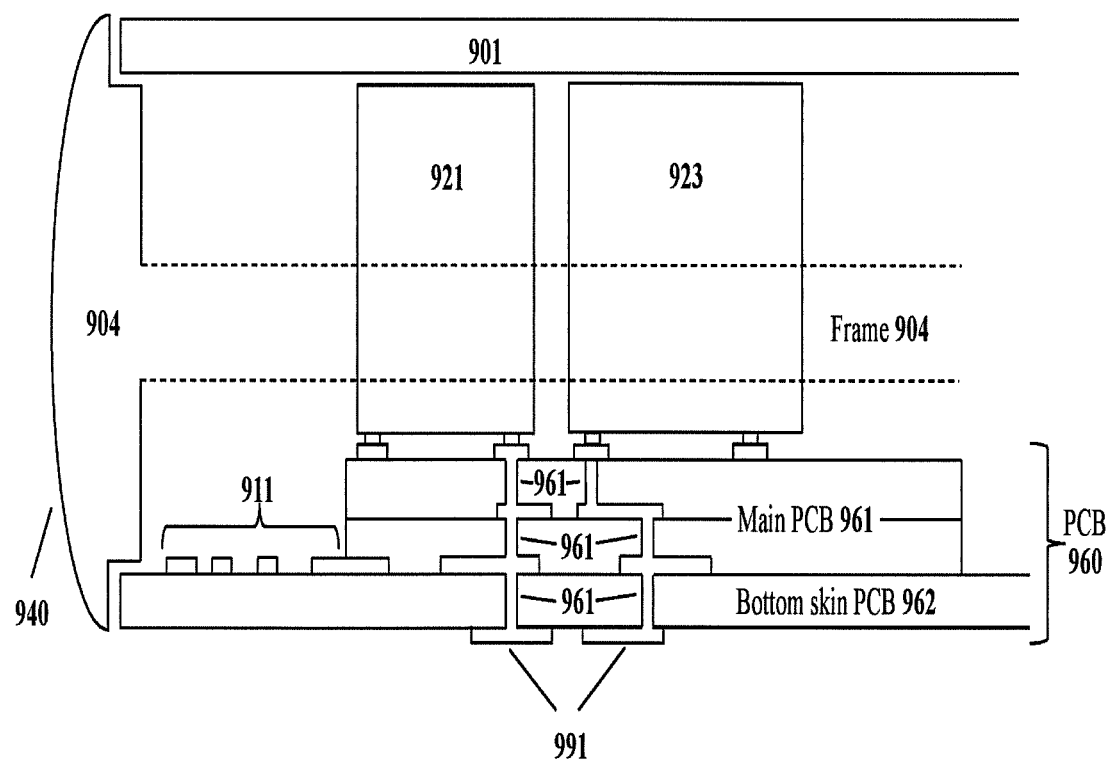
FIG. 9B illustrates a cross section view of the four layer PCB embodiment of FIG. 9A.

The bottom surface may also be made from materials used in the manufacture of printed circuit boards such as glass fiber reinforced epoxy material or Polyimide. In such a construction, the bottom surface and main printed circuit board (PCB) may be integrated together as a single unit by means of a multi-layer printed circuit board (PCB) process. FIGS. 9A and 9B illustrate such an embodiment.

FIG. 9A illustrates an isometric view of an embodiment that uses a four (4) metal layer printed circuit board to act as both the bottom skin surface 962 and the main printed circuit board 961. Antenna traces 911 may be placed on the inner surface of the bottom skin surface 962 to provide an antenna. The main printed circuit board carries internal electrical components 921, 922, 923, and 924. The various electrical components can be connected with vias 961 that connected the components to the metal wiring routed on the internal metal layers of the printed circuit board.

FIG. 9B illustrates a cross section view of the embodiment from FIG. 9A. As illustrated in the embodiment of FIG. 9B, the printed circuit board (PCB) 960 may be manufactured as a four layer board with four copper conductor layers. The top two conductor layers form the main printed circuit board 961 and may be used for majority of connections between the electrical components (such as component 921 and 923) within the programmable dynamic credential card. The bottom two conductor layers along with the printed circuit board (PCB) material between those bottom two conductor layers form the bottom surface 962 of the programmable dynamic credential card. The conductor routing layers may be in-set from the bottom surface layers for optimal thickness.

In the embodiment of FIG. 9B, the external contacts 991 for the EMV system can be on the outside of the bottom skin surface 962. The conductors for the solenoid coils, components for Near Field Communication (NFC), components for Radio Frequency Identifiers (RFID), or antennas for wireless communication may be integrated into the second layer conductors/traces used on the bottom surface 962. For example, antenna traces 911 are on the second metal conductor layer from the bottom. Additionally, the metal traces and/or soldermask material on the outer surface of the bottom surface might be integrated into the aesthetic artwork for that bottom surface.

In an embodiment where the bottom surface is created as a printed circuit board (PCB) that is separate from the main printed circuit board (not shown), the bottom surface PCB still might carry traces and components to enable the above functionality with appropriately made interconnects (such as solder joints or conductive tape) between the main printed circuit board (PCB) and bottom surface printed circuit board (PCB).

Information such as the name of the card holder, account number, expiration date, etc. can be printed directly on the back surface. In one embodiment this information is laser engraved onto a metal surface. The back surface can also have a signature panel, on which the card holder can sign.

In one embodiment, the thickness stack-up for the critical area of the card near the magnetic stripe can be 0.003" (Layer 9 back surface)+0.002" (glue/Layer 8 film)+0.004" (Layer 6 PCB)+0.002" (glue)+0.014" (Layer 4 frame)+ 0.002" (glue)+0.003" (Layer 1 top surface)=0.030". This is just a specific example and other thicknesses can be used for the different layers and adhesive/bonding options in other embodiments. The thickness in this example can further be reduced by adjusting the thickness of the top and bottom surfaces as well as the frame layer. Note that the frame can be made slightly thinner by choosing components that have a lower profile. The thickness of the entire card can be further reduced by using laser welding instead of glue, which works when the top surface, bottom surface, and frame are all both made of metal.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A programmable credential card, comprising:
   a top surface layer having at least one opening through which a graphical display system is viewable;
   a rigid internal frame structure located below the top surface layer;
   the graphical display system, housed in the rigid internal frame structure, wherein the graphical display system is configured to cause the programmable credential card to act as one of multiple different types of payment instruments or tickets by presenting a coded image that corresponds to a particular type of the multiple different types of payment instruments or tickets, and wherein the coded image is determined based at least in part on context data associated with a context of the programmable credential card, wherein the context comprises at least a time, a date, and an event; and
   a printed circuit board affixed to the rigid internal frame structure, wherein the printed circuit board comprises at least one wireless communication component that is exposed via a bottom surface layer for communication with a computing device.

2. The programmable credential card of claim 1, wherein a plurality of coded images are associated with the programmable credential card, and wherein the plurality of coded images includes at least one of a bar code or a QR code.

3. The programmable credential card of claim 1, wherein the context further comprises at least one of a geolocation or a venue.

4. The programmable credential card of claim 1, wherein at least a portion of the context data is obtained from the computing device via a wireless communication protocol.

5. The programmable credential card of claim 1, wherein at least a portion of the context data is obtained via a global positioning system (GPS) component of the programmable credential card.

6. The programmable credential card of claim 1, wherein the coded image corresponds to a ticket for the event.

7. The programmable credential card of claim 1, wherein the coded image corresponds to a loyalty card.

8. The programmable credential card of claim 1, wherein the coded image corresponds to a security access card corresponding to the event.

9. The programmable credential card of claim 1, wherein the coded image is configured to communicate information associated with at least one of a credit card, an ATM card, a debit card, a driver's license, a library card, a loyalty card, an RFID security card, an EMV card, an electric car charging card, or a security access card.

10. The programmable credential card of claim 1, wherein the coded image is configured to communicate information associated with at least one of an e-gift card, a stored value card, a sports event ticket, an airline ticket, or a concert ticket.

11. The programmable credential card of claim 1, wherein the coded image is configured to be read by an optical scanner.

12. The programmable credential card of claim 1, wherein the coded image corresponds to a payment card and wherein information associated with the coded image is configured to initiate payment at least partly responsive to receipt by a point-of-sale device via an optical scanner.

13. The programmable credential card of claim 1, wherein the graphical display system is further configured to automatically present the coded image based on the context of the programmable credential card.

14. A method comprising:
   providing a programmable credential card having:
   a top surface layer having at least one opening through which a graphical display system is viewable;
   a rigid internal frame structure located below the top surface layer;
   the graphical display system, housed in the rigid internal frame structure, wherein the graphical display system is configured to cause the programmable credential card to act as one of multiple different types of payment instruments or tickets by presenting a coded image that corresponds to a particular type of the multiple different types of payment instruments or tickets, and wherein the coded image is determined based at least in part on context data associated with a context of the programmable credential card, wherein the context comprises at least a time, a date, and an event; and
   a printed circuit board affixed to the rigid internal frame structure, wherein the printed circuit board comprises at least one wireless communication component that is exposed via a bottom surface layer for communication with a computing device;
   determining the context data associated with the context of the programmable credential card;
   determining, based at least in part on the context data, whether a security requirement is satisfied;
   based on determining that the security requirement is satisfied,
      determining, based at least in part on the context data, to select the coded image to present, wherein the coded image is selected from a plurality of coded images associated with the programmable credential card; and
      causing presentation, using the graphical display system, of the at coded image; and
   based on determining that the security requirement is not satisfied, refraining from displaying any coded image of the plurality of coded images.

15. The method of claim 14, wherein the computing device comprises at least one of a personal computer system, a mobile computing device, or a smartphone.

16. The method of claim 15, wherein the computing device comprises a mobile device, and wherein the security requirement comprises the mobile device being within a threshold distance of the programmable credential card.

17. The method of claim 15, wherein the context further comprises at least one of a geolocation or a venue.

18. The method of claim 15, wherein the plurality of coded images includes at least one of a bar code or a QR code.

19. A programmable credential card, comprising:
   a top surface layer having at least one opening through which a graphical display system is viewable;
   a rigid internal frame structure located below the top surface layer;
   the graphical display system, wherein the graphical display system is configured to automatically select and display at least one coded image of a plurality of coded images associated with the programmable credential card based on a context of the programmable credential card, and wherein the at least one coded image is determined based at least in part on context data associated with a context of the programmable credential card, wherein the context comprises at least a time, a date, and an event; and
   a printed circuit board affixed to the rigid internal frame structure having at least one electrical component.

20. The programmable credential card of claim 19, wherein the context further comprises at least one of a geolocation or a venue.

* * * * *

UNITED STATES PATENT AND TRADEMARK OFFICE
CERTIFICATE OF CORRECTION

| | | |
|---|---|---|
| PATENT NO. | : 11,847,518 B2 | Page 1 of 1 |
| APPLICATION NO. | : 17/861119 | |
| DATED | : December 19, 2023 | |
| INVENTOR(S) | : Kuldeep Amarnath and Ashutosh Dhodapkar | |

It is certified that error appears in the above-identified patent and that said Letters Patent is hereby corrected as shown below:

In the Claims

Column 20, Line 28, after "and wherein the", delete "at least one coded image is determined based at least in part on context data associated with a context of the programmable credential card, wherein the".

Signed and Sealed this
Twenty-third Day of April, 2024

*Katherine Kelly Vidal*

Katherine Kelly Vidal
*Director of the United States Patent and Trademark Office*